Oct. 31, 1950     H. R. DAVIS ET AL     2,528,426
SOLVENT EXTRACTION APPARATUS
Filed March 7, 1949
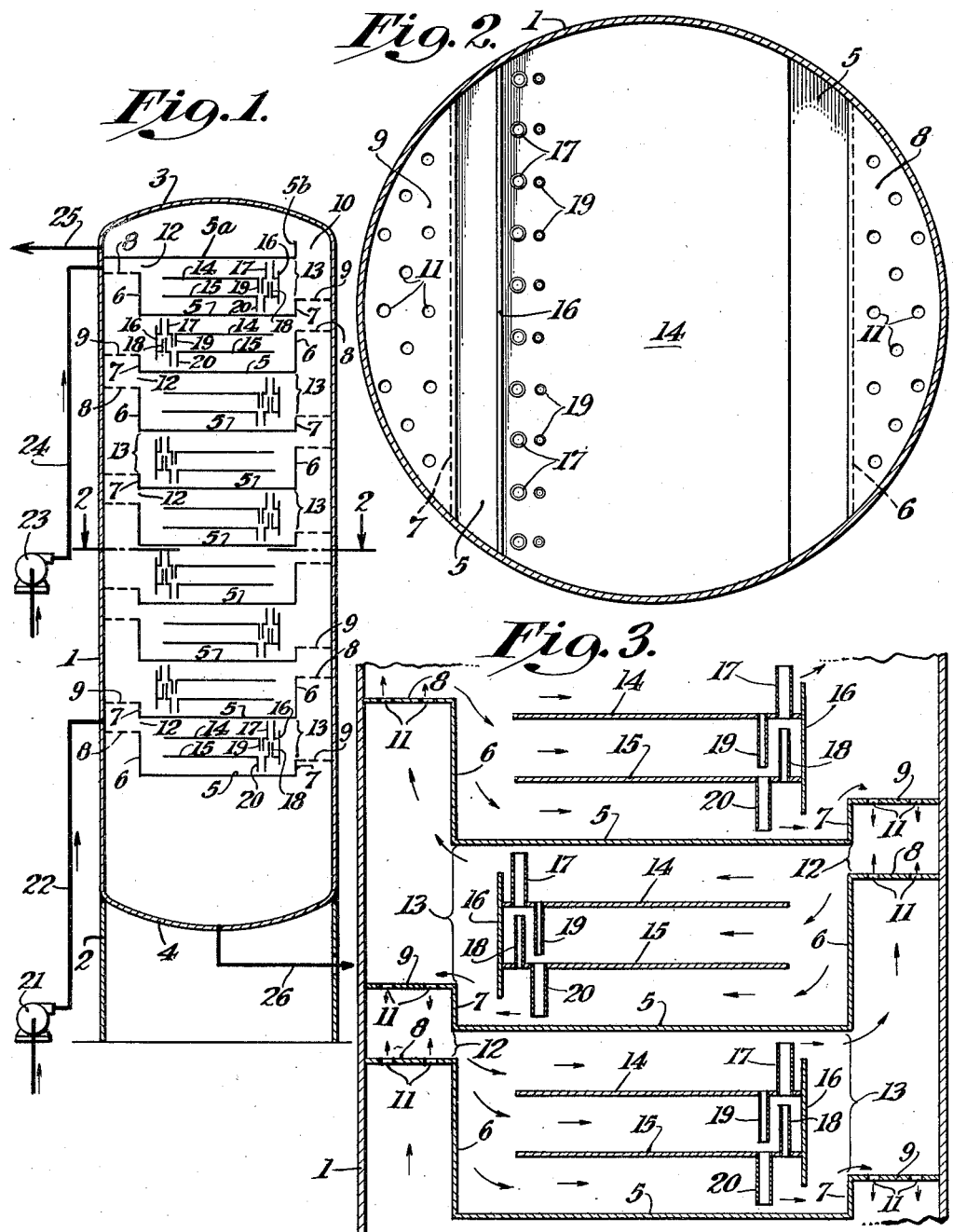
INVENTORS
Hyman R. Davis
and Fred Kraus
BY
Nathaniel Ely
ATTORNEY Patented Oct. 31, 1950

2,528,426

UNITED STATES PATENT OFFICE 2,528,426

SOLVENT EXTRACTION APPARATUS

Hyman R. Davis, Jackson Heights, and Fred Kraus, Pelham, N. Y., assignors to The Lummus Company, New York, N. Y., a corporation of Delaware Application March 7, 1949, Serial No. 80,002

5 Claims. (Cl. 23—270.5)

This invention relates to a type of solvent extraction operation wherein a liquid selective solvent is employed to extract undesired components from a liquid charge as, for example, the extraction of aromatics, naphthenes and/or other undesired components from a charge of lubricating oil.

Important objects of the invention are, to provide, in a simple manner, for more efficient performance of such an operation; to facilitate the separation of extract and raffinate phases from a mixture of the charge and the solvent by gravity settling; and to provide improved apparatus for effecting such separation.

Other objects and advantages of the invention will appear from the following description taken with the accompanying drawing.

In the drawing:

Figure 1 is a vertical sectional view of an extraction column embodying the invention;

Figure 2 is an enlarged horizontal section on the line 2—2 of Figure 1; and

Figure 3 is an enlarged vertical sectional view of a portion of the column shown in Figure 1.

According to the invention, in the specific form illustrated, a liquid solvent is introduced into the uppermost one of a vertical series of settling zones and conducted downwardly along said series. Simultaneously, a liquid charge lighter than the solvent is conducted upwardly along the series of zones, for multi-stage extraction of undesired components therefrom. At each zone a confluence and commingling of the descending and ascending liquids is effected and the resulting mixture is passed along a horizontal course through the zone. Within the zone the flowing mixture is divided into separate concurrent, superposed streams of reduced depth. An extract phase of the mixture settles along the bottom of each stream and a lighter raffinate phase rises and stratifies along the top of the stream. At substantially the end of the course, the settled extract phase of the upper stream or streams is drained to the bottom of the zone and the separated lighter phase of the mixture in the several streams is conducted to the upper portion of the zone. The separated extract phase is then conducted downwardly from the zone and commingled with an ascending lighter phase, and the resulting mixture is passed through the next lower zone and there separated into extract and raffinate phases in the manner just described. The final raffinate phase is conducted from the uppermost settling zone, and the final extract phase is conducted from the lowermost zone.

Within each zone settling stratification of the light and heavy phases is facilitated due to reduction of the settling depth by division of the moving body of liquid in the zone into superposed streams. Surfaces are also provided above and below each stream on which the light and heavy phases respectively, coalesce.

The apparatus shown for conducting the improved multi-stage extraction method includes an upstanding shell 1 supported by a skirt 2 and having closed upper and lower ends 3 and 4, respectively. The shell is shown as circular in cross section but it may be of other suitable form. Within the shell there is a series of substantially horizontal, vertically spaced deck plates 5. Each plate has straight, parallel opposite side edges forming chords of the circular shell. Between said chords the remaining edges conform to the interior of the shell and are secured thereto. Along said straight edges thereof, each deck plate has riser plates 6 and 7. Plate 6 is substantially taller than plate 7 but has its upper edge spaced below the level of the deck plate immediately above it. Both of the riser plates are rectangular and extend to the shell. Segmental plates 8 and 9, extend from the upper edges of the riser plates 6 and 7 respectively, to the shell and close the segmental spaces between said plates and the shell. The plates 5 to 9 inclusive, may be joined to one another and to the shell by welding or other suitable means. The riser plates are disposed in reverse positions on the successive deck plates so that each plate 8 is disposed beneath the next adjacent one of the plates 9. Above the uppermost one of the deck plates 5 there is a deck plate 5a secured to the shell and extending from one side of the shell and terminating short of the opposite side to afford a segmental flow space 10. The edge of the plate along said space has a weir 5b. Plates 5, 5a, 6 and 7 are solid or imperforate, while plates 8 and 9 have perforations 11 distributed over their area.

A series of settling zones is defined by the deck plates and the riser plates, together with the shell. Each zone is vertically delimited by two adjacent ones of the deck plates and has an inlet 12 between the riser 6 of the lower deck plate of the zone and the upper deck plate, and an outlet 13 between the upper deck plate and the riser of the lower deck plate. Within each zone there are one or more settling plates. Two of said plates are shown and designated 14 and 15, respectively. They are arranged substantially horizontally at levels equally spaced from each other and from the adjacent deck plates. Each settling plate has straight, parallel opposite edges and its remaining edges fit within the shell 1 and are secured thereto by welding or other suitable means. The straight edges of the two plates, at the side of the zone adjacent the outlet 13, lie within a vertical plane spaced from the riser plate 7 and have a vertical baffle plate 16 closing the space between the said edges and extending substantially above and below the plates. Said baffle plate terminates short of the upper and lower deck plates to afford flow space above and below the baffle. At the opposite side of the zone the edges of the settling plates are free and lie within a vertical plane spaced from the riser plate 6. The settling plates and the baffle plate 16 are secured to the shell by welding or other suitable means.

Closely along the baffle 16, the upper settling plate 14 has a row of riser pipes 17 leading upwardly from the under side of the plate and terminating short of the upper deck of the zone. Plate 15 has a row of riser pipes 18 in vertical alignment with the pipes 17 respectively and of smaller diameter. The pipes 18 lead upwardly from the under side of plate 15 and terminate short of the plate 14. Plate 14 has, alongside of the pipes 17 a row of drain pipes 19 extending downwardly from the upper side of the plate and terminating short of the under plate 15. Plate 15 has a row of larger drain pipes 20 leading downwardly from the upper side of said plate and terminating short of plate 5. These pipes are in vertical alignment with the pipes 19, respectively. Except for the riser pipes and the drain pipes the plates 14 and 15 are solid or imperforate throughout their area.

A pump 21 has a delivery pipe line 22 leading to the space between the opposed lowermost plates 8 and 9 of the column. Another pump 23 has a delivery pipe line 24 leading to the space between the uppermost plate 8 and the top deck 5a of the column. A discharge pipe line 25 leads from the shell space over the deck 5a, and another discharge pipe line 26 leads from the bottom of the shell.

In the operation of the apparatus just described a liquid solvent is continuously introduced into the upper portion of the column by the pump 23 and the line 24. Simultaneously, a charge of less specific gravity is continuously introduced into the column at the lower end of the series of settling zones by the pump 21 and the line 22. The operation is, in the main, a counter-current one with the heavier solvent passing downwardly within the column and the charge to be treated passing upwardly. The solvent is introduced first into the space between the uppermost deck 5a and the uppermost perforated plate 8. There, the charge ascending through the perforations of said plate is commingled with the solvent and the resulting mixture passes through the inlet 12 and into the uppermost settling zone. Within said zone, the mixture is passed along a substantially horizontal course and is divided by the plates 14 and 15 into a plurality of superposed concurrent streams within each of which a settling action takes place. A heavy phase containing undesired components of the charge settles upon the plates 14 and 15 and upon the lower deck of the zone. Near the end of the course, the heavy phase collected by said plates at intermediate levels is drained through the pipes 19 and 20 to the lower deck of the zone. A lighter phase of the mixture, stratifying at the upper portion of the space between the plates 14 and 15 and the space between the plate 15 and the lower deck of the zone, is conducted through the riser pipes 18 and 17 to the upper portion of the space between the plate 14 and the upper deck of the zone. The light and heavy phase liquids then pass respectively over and under the baffle 16 and out through the zone outlet 13. The lighter phase ascends over the weir 5b and into the space over the top deck 5a whence it is withdrawn through the pipe 25 as the final raffinate.

The separated heavy phase flows over the low riser 7 and then downwardly through the perforations in the plate 9 and into the space between said plate and the perforated plate 8 beneath it. There, said descending heavy phase is mixed with a light phase ascending through the perforations in said plate 8 from the third zone from the top and the mixture is passed into the second zone. Within said second zone the mixture is subjected to a settling treatment precisely like that described with respect to the first zone. From said second zone, the separated light and heavy phases pass through the outlet of the zone to the mixing space between the uppermost perforated plates 8 and 9. Thence, the light phase flows upward through said plate 8 to mix with the solvent delivered by the line 24, and the heavy phase descends through said perforated plate 9 and is mixed with a light phase ascending through the next underlying plate 8. This mixture is passed to the third zone for settling. In like manner, light and heavy phases are passed to the succeeding zones of the column and are mixed prior to entering each zone.

The size, number and distribution of the perforations in the plates 8 and 9 are designed to obtain adequate mixing effect and also to produce a desired pressure drop. From the lowermost settling zone the separated heavy phase descends through the lowermost perforated plate to the space within the lower end portion of the shell and is thence discharged through the line 26 as the final extract phase. The light phase from said zone ascends through the perforations in the plate 8 directly above said plate 9. During the operation the column is maintained fully charged with liquid.

The provision for separately collecting the settled heavy phase within each settling zone at intermediate levels and for conducting away the separated phases from the various levels constitutes an important feature of the invention. The plates 14 and 15 substantially reduce the settling depth and facilitate settling and collection of the undesired components of the charge. Assuming for example, that the diameter of the column is 10 feet and the deck spacing is 2 feet, the said plates will reduce the stream depth to approximately one third of said spacing, and the plates may be 5 or 6 feet in length along the streams. The plates also provide coalescing surfaces for the said charge components so that same form a continuous liquid phase for drainage from the plates.

Assuming that the charge to be treated is lubricating oil, solvents such as phenol, chlorex, furfural or nitrobenzene for examples, may be employed satisfactorily in the disclosed process. Operating temperatures may range from 50° F. to 300° F., and operating pressures may range from 0 to 75 lbs. per square inch gauge. The utility of the process and the apparatus however, is by no means limited to the charge and the solvents mentioned. Other oils, either mineral or vegetable, as well as non-oleaginous liquids may be satisfactorily treated according to the invention with suitable solvents. Neither is the utility of the invention limited to the treatment of a charge with a heavier solvent. The apparatus disclosed may be employed satisfactorily with a solvent lighter than the charge by merely reversing the points of introduction of the charge and the solvent to the extraction column and removing the raffinate phase through the bottom discharge line 26 and the extract phase through the upper discharge line 25.

While a very desirable form and employment of the invention are disclosed, modifications of both are possible within the scope of the invention. It is to be understood therefore that the present disclosure is merely illustrative and in nowise limiting and that the invention comprehends such modifications as will fall within the scope of the claims.

We claim:

1. Solvent extraction apparatus comprising a settling chamber having spaced superposed upper and lower walls and an inlet and an outlet located at opposite sides of the chamber to pass a mixture of a liquid charge and a liquid solvent along a substantially horizontal course through the chamber between said walls, a partition mounted within the chamber at an intermediate level between said walls to split the mixture within said course into superposed concurrent streams, said lower wall and said partition forming collecting surfaces for a heavy liquid phase settled from said streams respectively, conduit means extending downwardly from the partition to drain a heavy separated liquid phase collected thereon to said lower wall, conduit means extending upwardly from the partition to conduct a lighter separated liquid phase from beneath the partition to a level above the partition, said two conduit means being at the portion of the partition adjacent said chamber outlet, and baffle means at the end of the partition adjacent said outlet and extending above and below the partition to obstruct flow of liquid to said outlet except at levels substantially above and below the partition.

2. Solvent extraction apparatus as claimed in claim 1, wherein the said collecting surfaces are substantially horizontal.

3. Solvent extraction apparatus as claimed in claim 1 wherein the first-mentioned conduit means comprises pipes extending downwardly from said partition and the second-mentioned conduit means comprises pipes extending upwardly from the partition, said pipes of both conduit means being spaced apart in succession transversely of said course of the liquid through said chamber.

4. Solvent extraction apparatus comprising a settling chamber having spaced superposed upper and lower walls and an inlet and an outlet located at opposite sides of the chamber to pass a mixture of a liquid charge and a liquid solvent along a substantially horizontal course through the chamber between said walls, a plurality of superposed partitions mounted within said chamber at intermediate levels respectively between said walls to split the mixture within said course into superposed concurrent streams, said lower wall and said partitions forming collecting surfaces for a heavy phase separated from said streams respectively, conduit means extending downwardly from each of said partitions to drain a heavy separated liquid phase collected thereon to said lower wall, conduit means extending upwardly from each partition to conduct a lighter separated liquid phase from beneath each partition to a level above the partitions collectively, said two conduit means being at the portion of the partitions adjacent said chamber outlet, and baffle means at the end of the partitions adjacent said outlet and extending vertically between the partitions and above and below same to obstruct flow of liquid to said outlet except at levels substantially above and below the partitions collectively.

5. Solvent extraction apparatus comprising superposed chambers in vertical series and each as claimed in claim 1 together with a partition, conduit means and baffle means, all as claimed in said claim, for each chamber, the inlets and outlets of the chambers in succession being in reversed positions and in flow communication for reverse flow of liquid through the chambers in succession, and means associated with the inlet of each chamber to effect a mixture of a heavy liquid descending through said series and a lighter liquid ascending through the series and delivery of said mixture through said inlet.

HYMAN R. DAVIS.
FRED KRAUS.

REFERENCES CITED

The following references are of record in the file of this patent:

UNITED STATES PATENTS

| Number | Name | Date |
|---|---|---|
| 2,009,510 | Mobley | July 3, 1935 |
| 2,077,057 | Poole | Apr. 13, 1937 |
| 2,078,403 | Miller | Apr. 27, 1937 |
| 2,191,919 | Thayer | Feb. 27, 1940 |
| 2,345,667 | Hachmuth | Apr. 4, 1944 |